US012633056B2

(12) United States Patent
Catana Salazar et al.

(10) Patent No.: US 12,633,056 B2
(45) Date of Patent: May 19, 2026

(54) MAPS TO ENCODE DISPLACEMENTS IN DIGITAL 3D MODEL

(71) Applicant: Peridot Print LLC, Palo Alto, CA (US)

(72) Inventors: Juan Carlos Catana Salazar, Guadalajara (MX); Jun Zeng, Palo Alto, CA (US); Sergio Gonzalez Martin, Sant Cugat del Valles (ES)

(73) Assignee: PERIDOT PRINT LLC, Palo Alto, CA (US)

( * ) Notice: Subject to any disclaimer, the term of this patent is extended or adjusted under 35 U.S.C. 154(b) by 284 days.

(21) Appl. No.: 18/283,793

(22) PCT Filed: Mar. 31, 2021

(86) PCT No.: PCT/US2021/025206
§ 371 (c)(1),
(2) Date: Sep. 23, 2023

(87) PCT Pub. No.: WO2022/211807
PCT Pub. Date: Oct. 6, 2022

(65) Prior Publication Data
US 2024/0303928 A1    Sep. 12, 2024

(51) Int. Cl.
*G06T 17/20* (2006.01)
*B29C 64/386* (2017.01)
*B33Y 50/00* (2015.01)
*G06T 17/05* (2011.01)

(52) U.S. Cl.
CPC ............ *G06T 17/20* (2013.01); *B29C 64/386* (2017.08); *B33Y 50/00* (2014.12); *G06T 17/05* (2013.01)

(58) Field of Classification Search
CPC ....................................................... B33Y 10/00
See application file for complete search history.

(56) References Cited

U.S. PATENT DOCUMENTS

| | | | |
|---|---|---|---|
| 2014/0297014 A1 | 10/2014 | Iverson et al. | |
| 2014/0324204 A1* | 10/2014 | Vidimce | G06T 17/20 700/98 |
| 2016/0104314 A1* | 4/2016 | Nakazato | G06T 17/00 382/285 |
| 2016/0162608 A1 | 6/2016 | Rockwood | |
| 2016/0357878 A1 | 12/2016 | Mattson et al. | |
| 2017/0085733 A1* | 3/2017 | Ilic | G06T 19/20 |
| 2018/0205926 A1 | 7/2018 | Mogalapalli et al. | |
| 2018/0322623 A1 | 11/2018 | Memo et al. | |
| 2021/0019939 A1* | 1/2021 | Hu | G06T 3/067 |
| 2024/0000592 A1* | 1/2024 | Dillon | A61F 2/07 |

* cited by examiner

*Primary Examiner* — Ryan McCulley
(74) *Attorney, Agent, or Firm* — Michael Dryja

(57) ABSTRACT

According to examples, a processor may identify locations on a digital 3D model of an object corresponding to positions at which features are to be added to the object. For each of a plurality of locations of the identified locations, the processor may identify displacements of each of a plurality of patch points around the location from the surface of the digital 3D model. The processor may also create a map of the digital 3D model that encodes the identified displacements of the patch points around the locations, in which a 3D fabrication system is to fabricate the object to include the plurality of features based on the digital 3D model and the created map.

17 Claims, 6 Drawing Sheets

COMPUTER-READABLE MEDIUM
100

IDENTIFY LOCATIONS CORRESPONDING TO POSITIONS AT WHICH FEATURES ARE TO BE ADDED TO AN OBJECT
102

IDENTIFY DISPLACEMENTS OF THE SAMPLED PATCH POINTS
104

CREATE A MAP THAT ENCODES THE IDENTIFIED DISPLACEMENTS
106

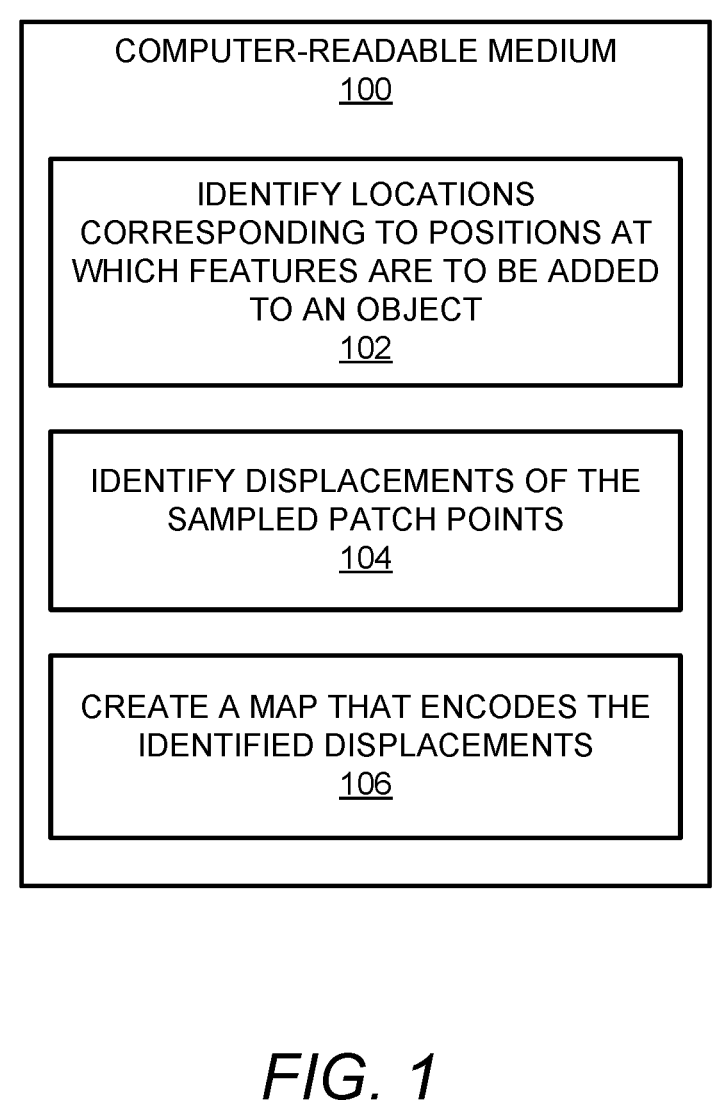

COMPUTER-READABLE MEDIUM
100

IDENTIFY LOCATIONS
CORRESPONDING TO POSITIONS AT
WHICH FEATURES ARE TO BE ADDED
TO AN OBJECT
102

IDENTIFY DISPLACEMENTS OF THE
SAMPLED PATCH POINTS
104

CREATE A MAP THAT ENCODES THE
IDENTIFIED DISPLACEMENTS
106

FIG. 1

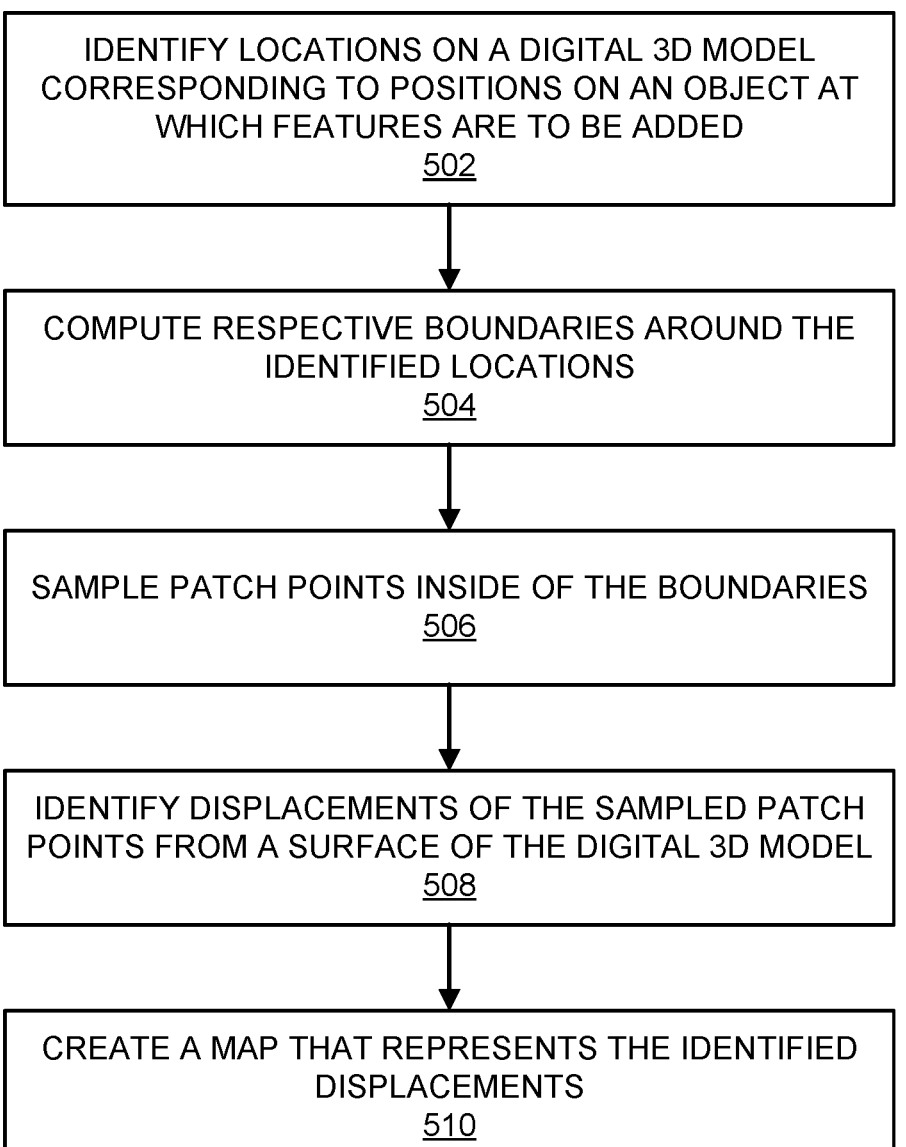

500

IDENTIFY LOCATIONS ON A DIGITAL 3D MODEL
CORRESPONDING TO POSITIONS ON AN OBJECT AT
WHICH FEATURES ARE TO BE ADDED
502

COMPUTE RESPECTIVE BOUNDARIES AROUND THE
IDENTIFIED LOCATIONS
504

SAMPLE PATCH POINTS INSIDE OF THE BOUNDARIES
506

IDENTIFY DISPLACEMENTS OF THE SAMPLED PATCH
POINTS FROM A SURFACE OF THE DIGITAL 3D MODEL
508

CREATE A MAP THAT REPRESENTS THE IDENTIFIED
DISPLACEMENTS
510

*FIG. 5*

MAPS TO ENCODE DISPLACEMENTS IN DIGITAL 3D MODEL

BACKGROUND

Three-dimensional (3D) fabrication systems may fabricate objects based on 3D models, such as 3D triangle mesh models, of the objects. The 3D models may include a plurality of data points, e.g., surfaces, vertices, etc. Modification of the 3D models to include additional features may result in the 3D models having addition data points.

BRIEF DESCRIPTION OF THE DRAWINGS

Features of the present disclosure are illustrated by way of example and not limited in the following figure(s), in which like numerals indicate like elements, in which:

FIG. 1 shows a block diagram of an example computer-readable medium that may have stored thereon computer-readable instructions for creating a map of a digital 3D model, in which the map may encode identified displacements of patch points around a plurality of locations on the digital 3D model;

FIG. 5 shows a flow diagram of an example method for creating a map of a digital 3D model, in which the map represents identified displacements of a plurality of patch points.

DETAILED DESCRIPTION

Figure 2:
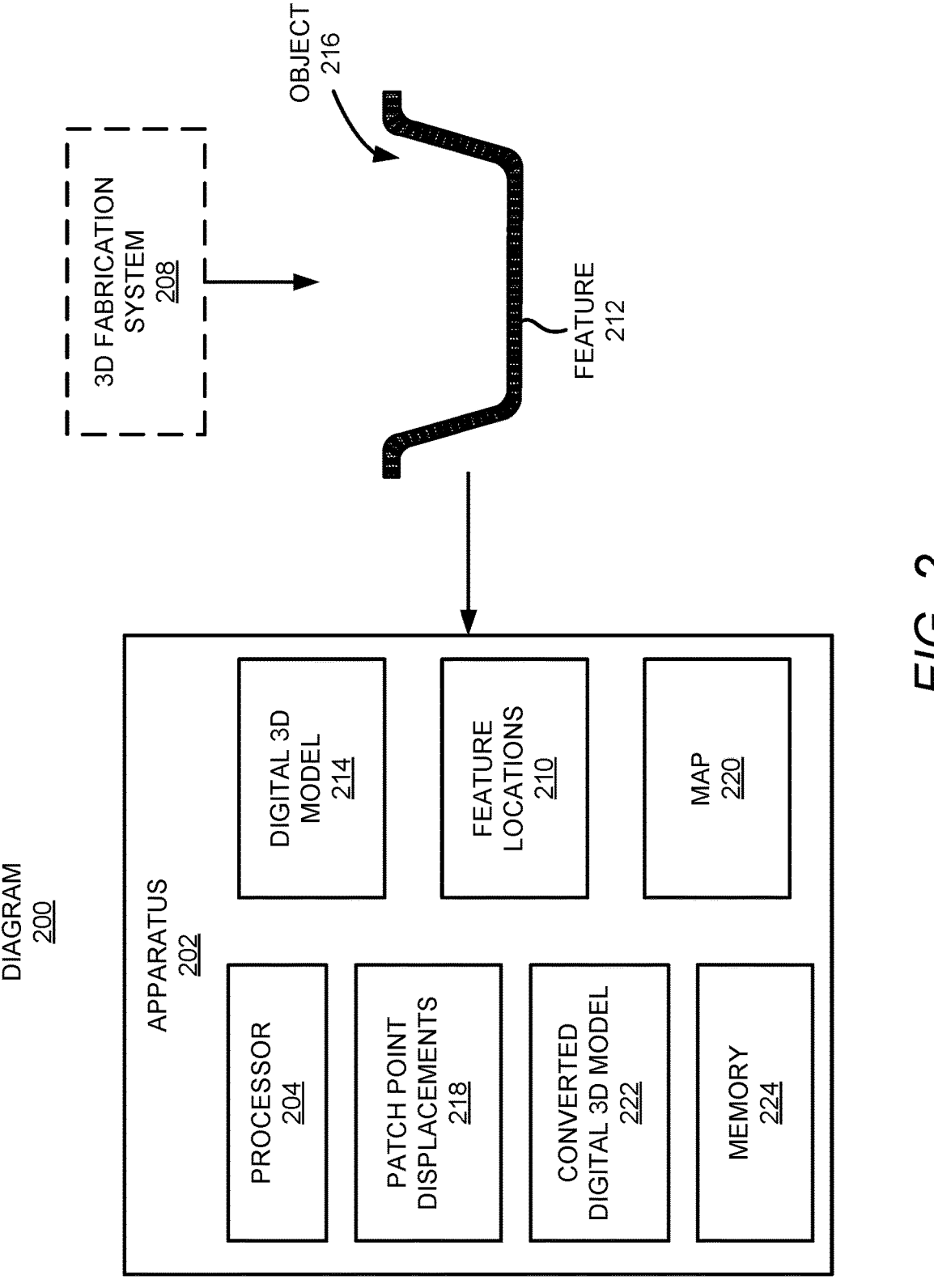
FIG. 2 shows a diagram of an apparatus, which includes an example processor that may execute the computer-readable instructions stored on the example computer-readable medium depicted in FIG. 1.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are computer-readable media, apparatuses, and methods, in which a processor may create or generate a map that may encode displacements of features to be added to an object when the object is fabricated. In some examples, the map may be a displacement map. The object may be, for instance, a screen, and the features may be, for instance, pores to be formed through the object, protrusions that are to be formed on the object, and/or the like. In addition, the map may have various colors and/or gray-scales, in which the various colors and/or grayscale values may correspond to various displacements, e.g., heights or depths.

Generally speaking, the processor may identify locations on a 3D model of an object corresponding to positions at which the features are to be added to the object. The processor may also, for each of the identified locations (or a plurality of the identified locations), identify displacements of a plurality of points around the location. Particularly, for instance, the processor may, for each of the identified locations, compute a boundary having a predefined dimension around the location. The predefined boundary may correspond to the size, e.g., width, of the features to be added to the object and may extend in two dimensions on the surface of the 3D model around the location. The processor may sample a plurality of patch points inside of the computed boundary and may identify displacements of the sampled plurality of patch points. The patch points may be defined as points inside of the predefined boundary at which the processor may analyze the predefined boundary. The processor may position the patch points at set distances with respect to each other and/or the processor in a random or pseudorandom manner.

The processor may also create a map of the digital 3D model that encodes the identified displacements of the patch points in the computed boundaries. That is, the map may encode the displacements and their respective locations. In some examples, the map may also encode displacement values that may have been interpolated between the patch points.

According to examples, the map may be maintained as a separate file from the digital 3D model. In other words, the digital 3D model of the object may not be modified to incorporate digital representations, e.g., mesh representations, of the features. Instead, a 3D fabrication system may use both the digital 3D model and the map to fabricate the object with the features. As a result, the complexity and the file size of the digital 3D model may not be increased, while still enabling the object to be fabricated with the features.

A technical issue with modifying digital 3D models to include representations, e.g., triangle meshes, of features may be that the sizes of files of the modified digital 3D models may be significantly increased. The increase in the file sizes may result in increased storage usage as well as increased processing resource usage. A technical feature afforded by the present disclosure may be that objects may be fabricated to include features without modifying the digital 3D models to include representations of the features. This may be accomplished through the creation and usage of a map that may encode the locations and displacements of the features with respect to the digital 3D model. As the map may be significantly less complex than a modified version of the digital 3D model, the map and the digital 3D model may be represented by smaller file sizes, which may enable reduced storage space as well as reduced processing resource usage.

Reference is first made to FIGS. 1, 2, 3A, 3B, and 4A-4D. FIG. 1 shows a block diagram of an example computer-readable medium 100 that may have stored thereon computer-readable instructions for creating a map 220 of a digital 3D model 214, in which the map 220 may encode identified displacements of patch points 406 within boundaries 404 around a plurality of locations 402 on the digital 3D model 214. FIG. 2 shows a diagram 200 of an apparatus 202, which includes an example processor 204 that may execute the computer-readable instructions stored on the example computer-readable medium 100 depicted in FIG. 1.

Figure 3A:
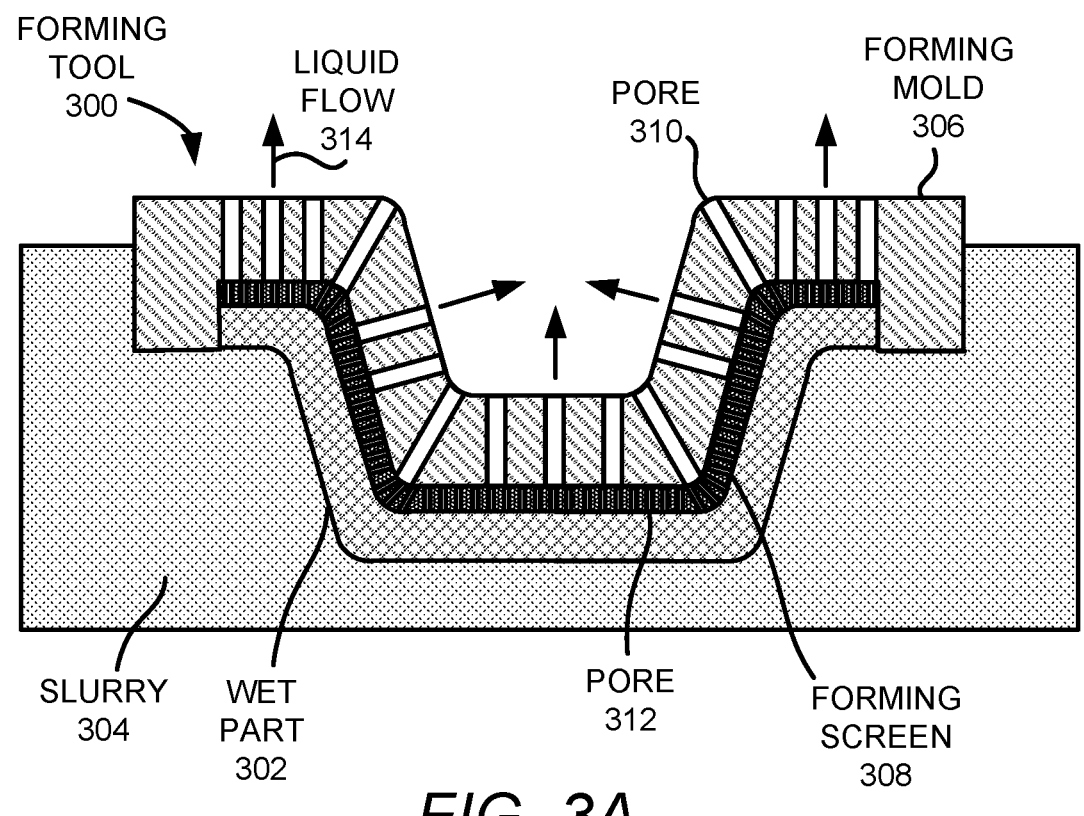
FIGS. 3A and 3B, respectively, depict, cross-sectional side views of an example forming tool and an example transfer tool, which may include a screen that may be fabricated using the digital 3D model and the map shown in FIG. 2.
Figure 3B:
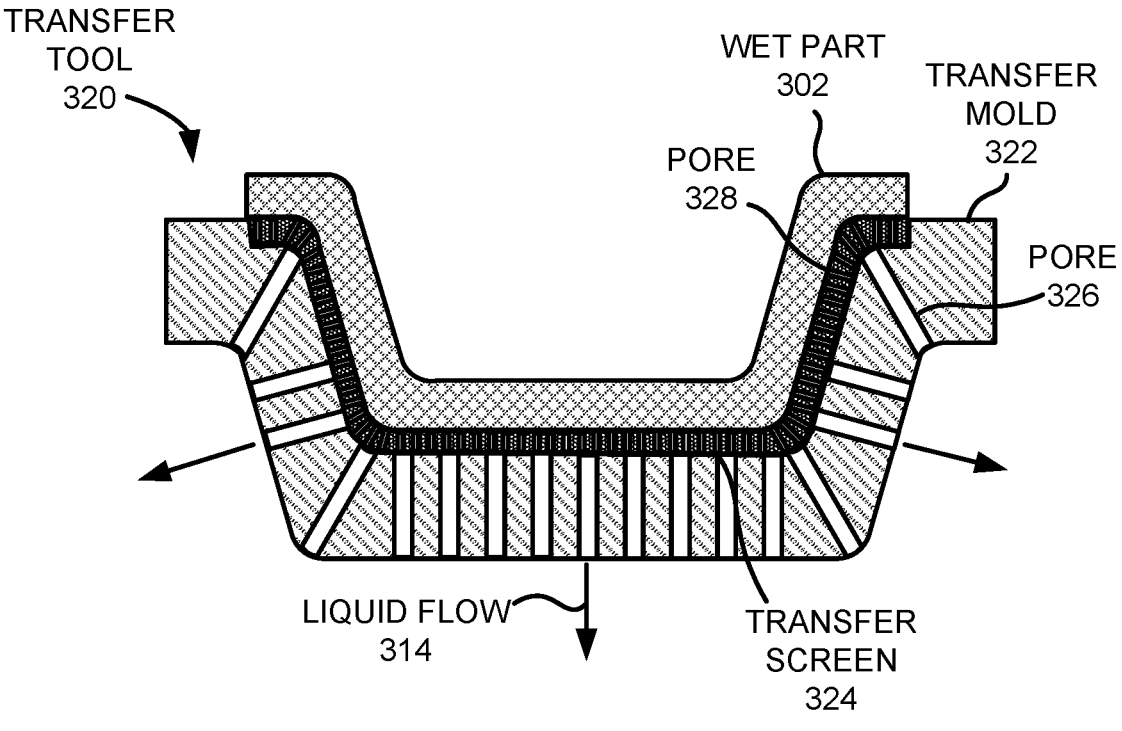
Figure 4A:
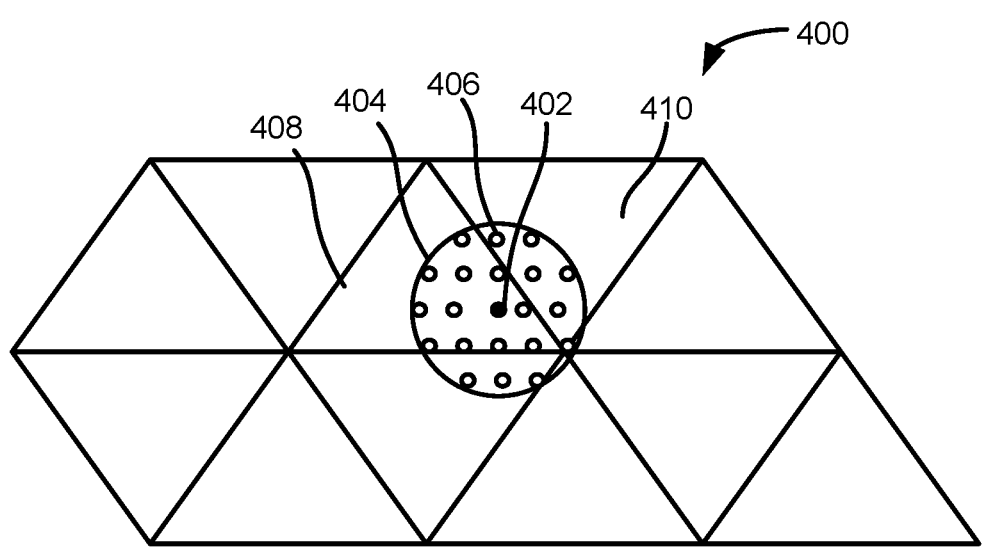
FIGS. 4A-4D respectively show example diagrams of a portion of a digital 3D model during various stages in which a map of the digital 3D model depicted in FIGS. 1 and 2 may be created.
Figure 4B:
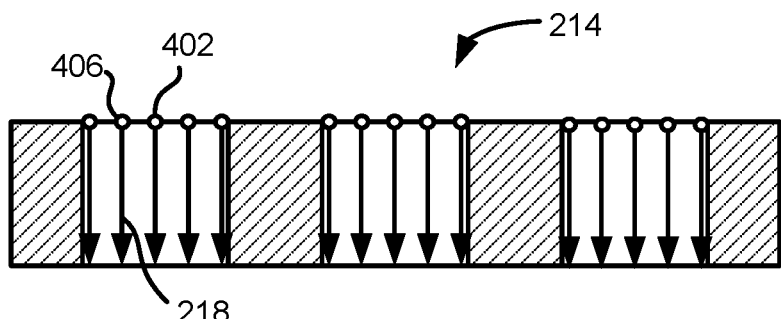
Figure 4C:
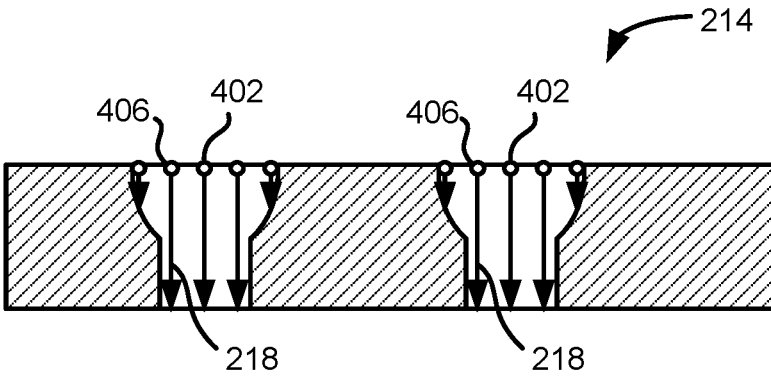
Figure 4D:
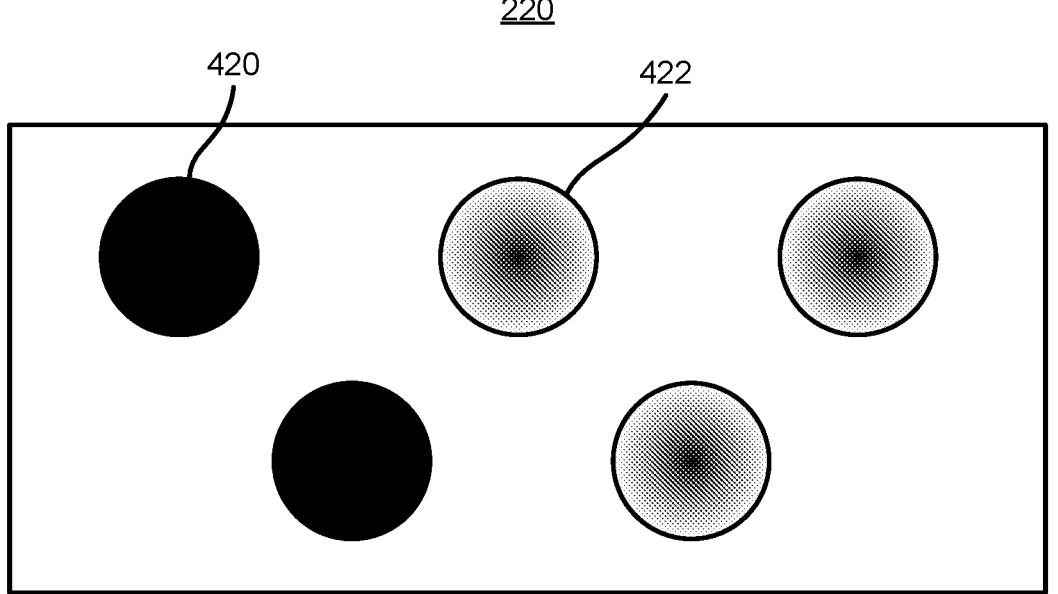

FIGS. 3A and 3B, respectively, depict, cross-sectional side views of an example forming tool 300 and an example transfer tool 320, which may include a screen that may be fabricated using the digital 3D model and the map shown in FIG. 2. FIGS. 4A-4C respectively show example diagrams of a portion of a digital 3D model 214 during various stages in which a map 220 of the digital 3D model 214 depicted in FIGS. 1 and 2 may be created. FIG. 4D shows an example diagram of a portion of a map 220 that encodes displacements of patch points around locations at which a plurality of features are to be added to an object.

It should be understood that the example computer-readable medium 100 depicted in FIG. 1, the example apparatus 202 depicted in FIG. 2, the example forming tool 300 and the example transfer tool 320 respectively depicted in FIGS. 3A and 3B, and the diagrams depicted in FIGS. 4A-4D may include additional attributes and that some of the attributes described herein may be removed and/or modified without departing from the scopes of the example computer-readable medium 100, the example apparatus 202, the example forming tool 300, the example transfer tool 320, and/or the diagrams depicted in FIGS. 4A-4D.

The computer-readable medium 100 may have stored thereon computer-readable instructions 102-106 that a processor, such as the processor 204 depicted in FIG. 2, may execute. The computer-readable medium 100 may be an electronic, magnetic, optical, or other physical storage device that contains or stores executable instructions. The computer-readable medium 100 may be, for example, Random Access memory (RAM), an Electrically Erasable Programmable Read-Only Memory (EEPROM), a storage device, an optical disc, and the like. Generally speaking, the computer-readable medium 100 may be a non-transitory computer-readable medium, in which the term "non-transitory" does not encompass transitory propagating signals.

The processor 204 may fetch, decode, and execute the instructions 102 to identify locations 210 on a digital three-dimensional (3D) model 214 of an object 216 corresponding to positions at which a plurality of features 212 are to be added to the object 216. That is, the processor 204 may obtain, e.g., access, download, retrieve, or the like, the digital 3D model 214 from a data source (not shown). The data source may be local to the apparatus 202 or may be remote from the apparatus 202 and thus, for instance, the processor 204 may obtain the digital 3D model 214 from a local data storage via a local connection or from a remote data storage via a network connection, e.g., the Internet. The processor 204 may also obtain the locations 210 of the features 212 from a data source in any of the listed manners.

The locations 210 of the features 212, which may be user-defined, defined by an algorithm, and/or the like, may be defined in a data file, for instance, as locations in a 3D coordinate system, such as the Cartesian coordinate system. The object 216 may be any type of object on which a number of features 212 are to be formed. The features 212 may be pores that may extend into the body of the object 216 from a surface of the object 216. In addition or alternatively, the features 212 may be protrusions that may extend from a surface of the object 216. By way of particular example, the object 216 may be a screen for use in the formation of molded fiber pulp parts. For instance, the object 216 may be a screen for a forming tool or a screen for a transfer mold and the features 212 may be pores that may extend through the screen and/or pillars that may extend on the screen. The object 216 may additionally or alternatively be a forming mold 306 or a transfer mold 322. In any of these examples, the feature locations 210 may correspond to the locations on the object 216 at which pores and/or pillars are to be formed.

According to examples, the feature locations 210 may have previously been positioned in the digital 3D model 214 of the object 216. In other examples, the processor 204 may process the digital 3D model 214 to algorithmically add the plurality of feature locations 210 to the digital 3D model 214. For instance, the processor 204 may employ packing operations to determine the locations at which the features 212 are to be placed in the object 216. By way of example, the processor 204 may implement a packing algorithm that may cause a maximum number of feature locations 210 to be added to the object 216 while causing the object 216 to have a certain level of mechanical strength, e.g., to prevent weak points. In this example, the algorithm may be a sphere or ellipsoid packing algorithm or other suitable algorithm for determining placements of the feature locations 210.

Examples of a forming tool 300 including a forming screen 308 and a transfer tool 320 including a transfer screen 324 are shown in FIGS. 3A and 3B. According to examples, the forming tool 300 and the transfer tool 320 may be employed in the fabrication of a wet part 302 from a slurry 304 of a liquid and material elements. In some examples, the liquid may be water or another type of suitable liquid in which pulp material, e.g., paper, wood, fiber crops, bamboo, or the like, may be mixed into the slurry 304. The material elements may be, for instance, fibers of the pulp material. The wet part 302 may thus be formed of molded fiber. The forming tool 300 and the transfer tool 320 are described in greater detail hereinbelow.

The digital 3D model 214 may be a 3D computer model of the object 216, such as a computer aided design (CAD) file, or other digital representation of these components. By way of example, the digital 3D model 214 may be a mesh model and particularly, a digital 3D triangle mesh model. In other words, the digital 3D model 214 may include a set of triangles that may be connected to other triangles by their common edges and/or corners, in which the set of triangles may represent surfaces of the digital 3D model 214. Generally speaking, the resolution of the digital 3D model 214 may be increased through use of smaller triangles, but the amount of space in a file used to store the digital 3D model 214 may also be increased to represent the increased number of triangles. Additionally, greater number of triangles may be used to represent smoother curvatures in the surface of the digital 3D model 214.

The processor 204 may fetch, decode, and execute the instructions 104 to, for each location 402 of a plurality of the feature locations 210 on the digital 3D model 214, identify displacements 218 of a plurality of sampled patch points 406. The identified displacements 218 of the sampled patch points 406 may also include the displacement of the location 402. The displacements 218 of the location 402 and the sampled patch points 406 may be user-defined. For instance, the displacements 218 may be defined to extend from one surface of the digital 3D model 214 to an opposite surface of the digital 3D model 214. In some examples, the directions of the displacements 218 may correspond to a direction that is normal to the plane of the triangle 408 on which the location 402 is positioned. By way of example, patch points 406 positioned on triangles 410 other than the triangle 408, may be displaced in the same direction as the location 402 even though the other triangles 410 may be on planes that differ from the plane of the triangle 408. In other examples, the directions in which the patch points 406 and the location 402 are directed may be user-defined to be other directions.

In some examples, the processor 204 may compute a boundary 404 having a predefined dimension around the location 402. An example of a portion 400 of a digital 3D triangle mesh model 214, in which a feature location 402 and a boundary 404 have been computed for the digital 3D triangle mesh model 214 is depicted in FIG. 4A. As shown in FIG. 4A, the boundary 404 may be computed such that the feature location 402 is centrally positioned within the boundary 404. In addition, the boundary 404 may have a circular cross-sectional shape, while in other examples, the boundary 404 may have another cross-sectional shape, such as a triangle, a polygon, etc. In a particular example, the boundary 404 may be a geodesic circle such that the boundary 404 may encompass portions of triangles that may be angled differently with respect to each other. In any of these examples, the predefined dimension may be a predefined diameter, a predefined width, and/or the like, and may correspond to an intended size, e.g., width, diameter, or the like, of the feature 212 to be formed in or on the object 216. By way of particular example, the predefined dimension may correspond to the intended diameters of the pores formed through the object 216.

The processor 204 may also sample the plurality of patch points 406 inside of the computed boundary 404 on a surface of the digital 3D model 214. The patch points 406 may be evenly distributed points inside of the computed boundary 404 around each location 402 of the plurality of locations. The patch points 406 may be points at which the processor 204 may determine the depths or heights of positions within the boundary 404. The processor 204 may position the patch points 406 randomly, pseudo-randomly, or according to a present arrangement. As discussed in further detail herein, the patch points 406 within a computed boundary 404 may be assigned the same displacements or some of the patch points 406 may have different displacements with respect to other ones of the patch points 406. In addition, the number or density of the patch points 406 positioned inside of the computed boundary 404 may be user-defined, defined based on a certain intended texture resolution, and/or the like.

In some instances, the displacements 218 of some of the patch points 406 and the location 402 inside of a boundary 404 may differ with respect to each other due to differences in height between surfaces of the digital 3D object 214. The displacements 218 may also differ amongst patch points 406 and locations 402 in other boundaries 404 for similar reasons. As a result, the displacements 218, e.g., the depths, of some of the patch points 406 and locations 402 may vary from each other depending on the positions of the patch points 406 and the locations 402 on the surface of the digital 3D model 214.

In some examples, the displacements 218 of some or all of the patch points 406 and the location 402 inside of a boundary 404 may be user-defined to form a feature 212 having a customizable feature 212 shape. For instance, the patch points 406 and the location 402 inside of a boundary 404 may all have the same displacements to form a feature 212, e.g., a pore, having a cylindrical or otherwise symmetrical cross-sectional shape, as shown in FIG. 4B. As another example, the patch points 406 and the location 402 within a certain distance of a center of a boundary 404 may extend from surface to surface of the digital 3D model 214 while the other patch points 406 may extend a certain portion of the distance from surface to surface. A diagram of this example configuration is depicted in FIG. 4C.

The processor 204 may fetch, decode, and execute the instructions 105 to create a map 220 that encodes the identified displacements 218 of the sampled patch points

406 in the plurality of the computed boundaries 404. The map 220 may encode the identified displacements 218 as various shades of gray while in other examples, the identified displacements 218 may be encoded as various colors. The various shades of gray may vary from black to white, in which black pixels may represent a maximum displacement value and white pixels may represent a minimum displacement value, or vice versa. Likewise, different colors may represent displacement values from a minimum displacement value to a maximum displacement value. As discussed herein, the displacement values may vary for various ones of the patch points 406 and the locations 402.

In some examples, the processor 204 may interpolate the displacements of the sampled patch points 406 to determine the displacements of areas inside of the boundaries 404 adjacent to the sampled patch points 406. The processor 204 may use any suitable interpolation technique to determine the displacements of those areas. In addition, the processor 204 may create the map 220 to also encode the areas with the displacements that may have been determined through interpolation of the displacements 218 of the sampled patch points 406. An example of a map 220 that may depict displacements values using various shades of gray is depicted in FIG. 4D. As shown in FIG. 4D, a first set of locations 420 may be represented as having completely black colors to denote the displacements as shown in FIG. 4B. Additionally, a second set of locations 422 may be represented as having multiple shades of gray to denote the displacements as shown in FIG. 4D.

According to examples, the processor 204 may create the map 220 from a converted digital 3D model 222. The digital 3D model 214 may be a digital 3D triangle mesh model 214 as discussed herein and the sampled patch points 406 may be identified in a Cartesian coordinate system. In some examples, to convert the digital 3D model 222, the processor 204 may translate the sampled plurality of patch points 406 on the digital 3D triangle mesh model 214 from the Cartesian coordinate system to a barycentric coordinate system. In the barycentric coordinate system, the positions of the patch points 406 and the locations 402 may be specified by reference to the triangles in which the patch points 406 and the locations 402 lie. The processor 204 may also create the map 220 based on the translated and sampled plurality of patch points 406 and locations 402 in each of a plurality of boundaries.

In some examples, the processor 204 may convert the digital 3D model 214 to the converted digital 3D model 222 by projecting the digital 3D triangle mesh model 214 in a two-dimensional (2D) unit space to cause the triangles in the digital 3D triangle mesh model 214 to be mapped into congruent 2D triangles. That is, for instance, the processor 204 may project the digital 3D triangle mesh model 214 into a 2D unit space by applying a UV mapping on the digital 3D triangle mesh model 214. In addition, the processor 204 may define the patch points 406 locally into the triangles, which may cause the patch points 406 to be projected into the 2D unit space. In these examples, the processor 204 may create the map 220 based on the converted digital 3D model 222, e.g., the projected digital 3D triangle mesh model into the 2D unit space.

According to examples, the digital 3D model 214 and the map 220 may be maintained as separate files. In other words, the digital 3D model 214 may not be modified to incorporate the displacements at the feature locations 210. Instead, the map 220 may encode the displacements at the feature locations 210. As a result, the digital 3D model 214 may not be modified to include triangles, e.g., points and vertices, that represent the displacements of the features 212. This may reduce or minimize the file size of the digital 3D model 214 while still enabling the features 212 to be formed on or in an object 216 when the object 216 is fabricated.

According to examples, a 3D fabrication system 208 may use both the digital 3D model 214 and the map 220 to fabricate the object 216 with the features 212. Thus, for instance, the 3D fabrication system 208 may use the digital 3D model 214 to determine how the object 216 is to be fabricated and may use the map 220 to determine the locations on or in the object 216 at which the features 212 are to be formed as well as their respective displacements. By way of example, the 3D fabrication system 208 may overlay the map 220 on the digital 3D model 214 to determine locations and displacements while in other examples, the 3D fabrication system 208 may use 3D coordinates identified in the digital 3D model 214 and the map 220 to determine the locations and the displacements of the features 212.

In some examples, the processor 204 may output the created map 220 and the digital 3D model 214 to the 3D fabrication system 208 as separate files with respect to each other and the 3D fabrication system 208 may fabricate the object 216 with the features 212 using these files. Particularly, the processor 204 may send the digital 3D model 214 and the created map 220 to a controller or processor of the 3D fabrication system 208, which may process or otherwise use the digital 3D model 214 and the created map 220 to fabricate the object 216 with the features 212. In other examples, the processor 204 may be the controller or processor of the 3D fabrication system 208, in which cases, the processor 204 may process or otherwise use the digital 3D model 214 and the created map 220 to fabricate the object 216 with the features 212.

The 3D fabrication system 208 may be any suitable type of additive manufacturing system. Examples of suitable additive manufacturing systems may include systems that may employ fusing and/or detailing agent jetting onto build material layers, curable binder jetting onto build materials (e.g., thermally or UV curable binders), ink jetting onto build materials, selective laser sintering, stereolithography, fused deposition modeling, etc. In a particular example, the 3D fabrication system 208 may form the object 216 with the features 212 by binding and/or fusing build material particles together. In any of these examples, the build material particles may be any suitable type of material that may be employed in 3D fabrication processes, such as, a metal, a plastic, a nylon, a ceramic, an alloy, and/or the like. Generally speaking, higher functionality/performance objects 216, such as screens for form molds and/or transfer molds, may be those with the smallest pore size to block fibers of smaller sizes, and hence some 3D fabrication system technologies may be more suited for generating the objects 216 with the features 212 than others.

In some examples, the processor 204 may be part of an apparatus 202, which may be a computing system such as a server, a laptop computer, a tablet computer, a desktop computer, or the like. The processor 204 may be a semiconductor-based microprocessor, a central processing unit (CPU), an application specific integrated circuit (ASIC), a field-programmable gate array (FPGA), and/or other suitable hardware device. The apparatus 202 may also include a memory 224 that may have stored thereon computer-readable instructions (which may also be termed computer-readable instructions) that the processor 204 may execute, such as the computer-readable medium 100 depicted in FIG. 1.

By way of example, the apparatus 202 may include a processor 204 and a memory 224 on which is stored instructions that when executed by the processor 204, may cause the processor to identify, with respect to a digital three dimensional (3D) model of an object, locations corresponding to positions at which a plurality of pores 212 are to be added to the object. The instructions may also cause the processor 204 to, for a location 402 of the identified locations 210, compute a geodesic circle 404 having a predefined dimension around the location 402, and sample a plurality of patch points 406 inside of the computed geodesic circle 404 on a surface of the digital 3D model 214. The instructions may further cause the processor 204 to identify depths of each of the sampled plurality of patch points 406 from the surface of the digital 3D model 214 and create a map 220 of the digital 3D model 214 that includes identifications of the identified depths.

In examples in which the object 216 is a screen, and with reference to FIG. 3A, the object 216 (e.g., forming screen 308) may be implemented in a formation of a wet part 302 from a slurry 304 of a liquid and material elements. In some examples, the object 216 may be a forming screen 308 of a forming tool 300. In other examples, the object 216 may be a transfer screen 324 of a transfer tool 320 as shown in FIG. 3B. The forming tool 300 and the transfer tool 320 are described in greater detail herein. Particularly, FIG. 3A shows a cross-sectional side view of a forming tool 300, in which a portion of the forming tool 300 has been depicted as being placed within a volume of the slurry 304. FIG. 3B shows a cross-sectional side view of the transfer tool 320 that may remove the wet part 302 from the forming screen 308. The forming tool 300 and the transfer tool 320 may collectively form a pulp molding tool set.

As shown in FIG. 3A, the forming tool 300 may include a forming mold 306 and a forming screen 308, in which the forming screen 308 may overlay the forming mold 306. As shown in FIG. 3B, the transfer tool 320 may include a transfer mold 322 and a transfer screen 324. As discussed herein, either or both of the forming screen 308 and the transfer screen 324 may be equivalent to the object 216 depicted in FIG. 2. In some examples, the forming screen 308 and the transfer screen 324 may be fabricated by a 3D fabrication system 208. The forming mold 306 and the transfer screen 324 may also be fabricated by the 3D fabrication system 208. In some examples, however, the transfer tool 320 may not include the transfer screen 324. The fabricated forming screen 308 and the fabricated transfer screen may be used to form wet parts 302, e.g., molded fiber articles.

In some examples, the forming mold 306 and/or the transfer mold 322 may be removably mounted onto respective supporting structures (not shown) such that, for instance, the forming mold 306 may be moved independently from the transfer mold 322. Moreover, the forming mold 306 and the forming screen 308 may be fabricated to have shapes to which the wet part 302 may be molded when formed on the forming screen 308. Likewise, the transfer mold 322 and the transfer screen 324 may be fabricated to have shapes that may engage multiple surfaces of the wet part 302 formed on the forming screen 308. The transfer screen 324 may have a shape that is complementary to the shape of the forming screen 308.

As shown, the forming mold 306 may be formed to have a relatively larger thickness than the forming screen 308 and the transfer mold 322 may be formed to have a relatively larger thickness than the transfer screen 324. In some examples, the transfer screen 324 and the forming screen 308 may have the same or similar thicknesses and/or the transfer mold 322 and the forming mold 306 may have the same or similar thicknesses. The larger thicknesses of the forming mold 306 and the transfer mold 322 may cause the forming mold 306 and the transfer mold 322 to be substantially more rigid than the forming screen 308 and the transfer screen 324. The forming mold 306 may provide structural support for the forming screen 308 and the transfer mold 322 may provide structural support for the transfer screen 324. By way of particular non-limiting example, the transfer screen 324 and the forming screen 308 may have thicknesses in the range of about 1 mm and 2 mm and the transfer mold 322 and the forming mold 306 may have thicknesses in the range of about 5-8 mm.

As also shown in FIGS. 3A and 3B, each of the forming mold 306, the forming screen 308, the transfer mold 322, and the transfer screen 324 may include respective pores 310, 312, 326, 328 that may extend completely through respective top and bottom surfaces of the forming mold 306, the forming screen 308, the transfer mold 322, and the transfer screen 324. The pores 312, 328 respectively in the forming screen 308 and the transfer screen may be significantly smaller than the pores 310, 326 respectively in the forming mold 306 and the transfer mold 322. In addition, a plurality of structural features, such as pillars (not shown) may be provided between the surfaces of the forming mold 306 and the forming screen 308 and between the transfer mold 322 and the transfer screen 324 that are respectively adjacent and face each other to enable liquid to flow laterally between the forming mold 306 and the forming screen 308 and between the transfer mold 322 and the transfer screen 324. As some of the pores 312 in the forming screen 308 may not directly align with the pores 310 in the forming mold 306 and some of the pores 328 in the transfer screen 324 does not directly align with the pores 326 in the transfer mold 322, channels (not shown) formed by the structural features may enable liquid to flow through those pores 312, 328 in addition to the pores 312, 328 that are directly aligned with respective the pores 310, 326.

Although not shown, the forming tool 300 may be in communication with a plenum to which a vacuum source may be connected such that the vacuum source may apply a vacuum pressure through the pores 310, 312 in the forming mold 306 and the forming screen 308. When the vacuum pressure is applied through the pores 310, 312, some of the liquid in the slurry 304 may be suctioned through the pores 310, 312 and may flow into the plenum as denoted by the arrows 314. As the liquid flows through the pores 310, 312, the forming screen 308 may prevent the material elements in the slurry 304 from flowing through the pores 312. That is, the pores 312 may have sufficiently small dimensions, e.g., diameters or widths, that may enable the liquid to flow through the pores 312 while blocking the material elements from flowing through the pores 312. In one regard, the diameters or widths of the pores 312 may be sized based on sizes of the material elements, e.g., fibers, in the slurry 304. By way of particular example, the pores 312 may have diameters of around 0.6 mm or smaller. However, in some instances, the pores 312 may have irregular shapes as may occur during 3D fabrication processes.

Over a period of time, which may be a relatively short period of time, e.g., about a few seconds, less than about a minute, less than about five minutes, or the like, the material elements may build up on the forming screen 308. Particularly, the material elements in the slurry 304 may be accumulated and compressed onto the forming screen 308 into the wet part 302. The wet part 302 may take the shape of the forming screen 308. In addition, the thickness and density of the wet part 302 may be affected by the types and/or sizes of the material elements in the slurry 304, the length of time that the vacuum pressure is applied while the forming mold 306 and the forming screen 308 are placed within the volume of the slurry 304, etc. That is, for instance, the longer that the vacuum pressure is applied while the forming mold 306 and the forming screen 308 are partially immersed in the slurry 304, the wet part 302 may be formed to have a greater thickness.

After a predefined period of time, e.g., after the wet part 302 having desired properties has been formed on the forming screen 308, the forming mold 306 and the forming screen 308 may be removed from the volume of slurry 304. For instance, the forming mold 306 may be mounted to a movable mechanism that may move away from the volume of slurry 304. In some examples, the movable mechanism may rotate with respect to the volume such that rotation of the movable mechanism may cause the forming mold 306 and the forming screen 308 to be removed from the volume of slurry 304. In other examples, the movable mechanism may be moved laterally with respect to the volume of slurry 304. As the forming mold 306 and the forming screen 308 are removed from the volume, some of the excess slurry 304 may come off of the wet part 302. However, the wet part 302 may have a relatively high concentration of liquid.

Following the formation of the wet part 302 on the forming screen 308 and movement of the forming screen 308 and the wet part 302 out of the volume of slurry 304, the transfer tool 320 may be moved such that the transfer screen 324 may contact the wet part 302 on the forming screen 308. That is, for instance, the transfer mold 322 may be attached to a movable mechanism (not shown), in which the movable mechanism may cause the transfer mold 306 and the transfer screen 324 to move toward the forming screen 308. In some examples, the transfer tool 320 may be moved to cause the transfer screen 324 to be in contact with the wet part 302 prior to the wet part 302 being de-watered while on the forming screen 308, e.g., within a few seconds of the wet part 302 being removed from the volume of slurry 304. In one regard, the transfer tool 320 may engage the wet part 302 relatively quickly after formation of the wet part 302, which may enable the transfer tool 320 to remove the wet part 302 relatively quickly and the forming tool 300 to be inserted into the volume of slurry 304 to form a next wet part 302.

In addition, the transfer tool 320 may be in communication with a plenum to which a vacuum source may connected such that the vacuum source may apply a vacuum pressure through the pores 326, 328 while the wet part 302 is in contact with the transfer screen 324. The vacuum source may be the same or a different vacuum source to which the forming tool 300 may be in communication. The vacuum pressure applied through the forming tool 300 may be terminated or reversed (e.g., applied in the opposite direction) while the vacuum pressure is applied through the transfer tool 320. Although the transfer tool 320 has been described as including a transfer screen 324, it some examples, the transfer screen 324 may be omitted from the transfer tool 320 such that, for instance, the transfer mold 322 may contact the wet part 302 directly during a transfer operation of the wet part 302 from the forming tool 300.

Turning now to FIG. 5, there is shown a flow diagram of an example method 500 for creating a map 220 of a digital 3D model 214, in which the map 220 represents identified displacements 218 of a plurality of patch points 406. It should be understood that the method 500 depicted in FIG.

5 may include additional operations and that some of the operations described therein may be removed and/or modified without departing from the scope of the method 500. The description of the method 500 is also made with reference to the features depicted in FIGS. 1-4C for purposes of illustration. Particularly, the processor 204 depicted in FIG. 2 may execute some or all of the operations included in the method 500 using the elements depicted in FIGS. 2-4C.

At block 502, the processor 204 may identify locations 210 on a digital three dimensional (3D) model 214 of an object 216 corresponding to positions on the object 216 at which a plurality of features 212 are to be added. As discussed herein, the object 216 may be a screen and the features 212 may be pores and/or pillars that are to be formed in or on the screen 216. In addition, the locations 210 at which the features are to be located may be user-defined, based on application of a packing algorithm, and/or the like. In any regard, the locations 210 may be points along a surface of the digital 3D model 214.

At block 504, the processor 204 may compute a respective boundary having a predefined dimension around the identified locations 210. The boundaries may have any suitable configuration, such as a circle, a polygon, etc. By way of particular example, the boundaries may be geodesic circles around the identified locations 210. The predefined dimension may correspond to an intended width of the feature 212 to be formed in or on the object 216.

At block 506, the processor 204 may sample a plurality of patch points 406 inside of the computed boundaries 404 on a surface of the digital 3D model 214. The arrangement and number of the plurality of patch points 406 sampled inside of the computed boundaries 404 may be based on an intended resolution of the map 220. Thus, for instance, a greater number of patch points 406 may be sampled for a greater resolution map 220.

At block 508, the processor 204 may identify displacements 218 of the sampled plurality of patch points 406. This may also include identifying the displacement of the feature location 402. As discussed herein, the displacements may be distances between opposing surfaces of the digital 3D model 214. As the thickness of the digital 3D model 214 may vary across various sections of the digital 3D model 214, the displacements 218 of the patch points 406 may also vary with respect to each other depending upon the positions at which the patch points 406 are located. In other examples, however, the displacements 218 of the patch points 406 may have been previously defined, e.g., by a user, to have particular sizes.

At block 510, the processor 204 may create a map 220 of the digital 3D model 214 that may represent the identified displacements 218 of the patch points 406, and in some instances, the location 402. In some examples, the processor 204 may interpolate the displacements of areas between the patch points 406 to enable the displacements across sections of the boundaries 404 on the digital 3D model 214 to be represented.

According to examples, the digital 3D model 214 may be a digital 3D triangle mesh model, in which the sampled plurality of patch points 406 are identified in a Cartesian coordinate system. In some instances, the processor 204 may translate the sampled plurality of patch points 406 on the digital 3D triangle mesh model 214 from the Cartesian coordinate system to a barycentric coordinate system. In addition, the processor 204 may create the map 220 based on the translated and sampled plurality of patch points 406.

In some instances, the processor 204 may project the digital 3D triangle mesh model 214 in a two-dimensional (2D) unit space to cause the triangles in the digital 3D triangle mesh model 214 to be mapped into congruent 2D triangles. In addition, the locations 402 and the patch points 406 may be mapped with their respective triangles from the digital 3D triangle mesh model 214 to the congruent 2D triangles. As some of the triangles that are adjacent to each other in the digital 3D triangle mesh model 214 may not be adjacent to each other in the 2D unit space (e.g., when UV mapping is performed), some of the patch points 406 that are within the same boundary 404 may be separated from each other in the 2D unit space. In addition, the processor 204 may create the map 220 based on the projected digital 3D triangle mesh model 214 into the 2D unit space.

As discussed herein, a 3D fabrication system 208 may fabricate the object 216 to include the plurality of features based on the digital 3D model 214 and the created map 220.

Some or all of the operations set forth in the method 500 may be contained as utilities, programs, or subprograms, in any desired computer accessible medium. In addition, the method 500 may be embodied by computer programs, which may exist in a variety of forms. For example, the method 500 may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A non-transitory computer-readable medium storing computer-readable instructions that when executed by a processor, cause the processor to:

identify locations on a digital three-dimensional (3D) model of an object corresponding to positions at which a plurality of features are to be added to the object;

generate a displacement map for the digital 3D model by, for each of a plurality of locations of the identified locations on the digital 3D model, respectively identifying displacements a plurality of patch points around the location from a surface of the digital 3D model, as depths towards an opposite surface of the digital 3D model, the displacement map encoding the identified displacements of the patch points around the locations; and provide the digital 3D model and the displacement map to a 3D fabrication system, such that the 3D fabrication system is to fabricate the object to include the plurality of features based on the digital 3D model and the displacement map, wherein as provided to the 3D fabrication system, the digital 3D model has not been modified based on the displacement map.

2. The non-transitory computer-readable medium of claim 1, wherein the instructions cause the processor to, for each of the plurality of locations:

compute a boundary having a predefined dimension around the location; and sample the plurality of patch points inside the computed boundary on the surface of the digital 3D model.

3. The non-transitory computer-readable medium of claim 2, wherein the object comprises a screen and the plurality of features comprise a plurality of pores to be formed in the object, the plurality of pores having a predefined diameter, and the boundary is computed to have the predefined diameter.

4. The non-transitory computer-readable medium of claim 3, wherein a depth of a first patch point in the plurality of patch points differs from a depth of a second patch point in the plurality of patch points.

5. The non-transitory computer-readable medium of claim 2, wherein the digital 3D model is a digital 3D triangle mesh model and, for a number of the plurality of locations, compute the boundary is computed to intersect multiple triangles in the digital 3D triangle mesh model, and wherein the displacements of the sampled plurality of patch points from the surface of the digital 3D triangle mesh model extend in a common direction with respect to each other regardless of different angles between the multiple triangles over which the boundary is computed to intersect.

6. The non-transitory computer-readable medium of claim 1, wherein the digital 3D model is a digital 3D triangle mesh model, the plurality of patch points are identified in a Cartesian coordinate system, and the instructions further cause the processor to:

translate the plurality of patch points on the digital 3D triangle mesh model from the Cartesian coordinate system to a barycentric coordinate system, wherein the displacement map is generated based on the translated plurality of patch points.

7. The non-transitory computer-readable medium of claim 1, wherein the digital 3D model is a digital 3D triangle mesh model and the instructions further cause the processor to:

project the digital 3D triangle mesh model in a two-dimensional (2D) unit space to cause triangles in the digital 3D triangle mesh model to be mapped into congruent 2D triangles, and wherein the displacement map is generated based on the projected digital 3D triangle mesh model into the 2D unit space.

8. The non-transitory computer-readable medium of claim 1, wherein the displacement map and the digital 3D model are provided to the 3D fabrication system as separate files.

9. The non-transitory computer-readable medium of claim 1, wherein the object comprises a fiber pulp-molding forming or transfer screen, and the plurality of features comprises a plurality of pores through which liquid of a fiber pulp slurry flows when molding a fiber pulp part using the object.

10. A method comprising:

identifying, by a processor, locations on a digital three dimensional (3D) model of an object corresponding to positions on the object at which a plurality of features are to be added;

computing, by the processor, respective boundaries having a predefined dimension around the identified locations;

sampling, by the processor, a plurality of patch points inside of the computed boundaries on a surface of the digital 3D model;

generating, by the processor, a displacement map for the digital 3D model by respectively identifying displacements of the sampled plurality of patch points from the surface of the digital 3D model, as depths towards an opposite surface of the digital 3D model, the displacement map representing the identified displacements; and providing, by the processor, the digital 3D model and the displacement map to a 3D fabrication system, such that the 3D fabrication system is to fabricate the object to include the plurality of features based on the digital 3D model and the displacement map, wherein as provided to the 3D fabrication system, the digital 3D model has not been modified based on the displacement map.

11. The method of claim 10, wherein the respective boundaries having the predefined dimension around the identified locations are computed to be geodesic circles that contact the surface of the digital 3D model.

12. The method of claim 10, wherein the digital 3D model is a digital 3D triangle mesh model, the sampled plurality of patch points are identified in a Cartesian coordinate system, and the method further comprises:

translating the sampled plurality of patch points on the digital 3D triangle mesh model from the Cartesian coordinate system to a barycentric coordinate system, and wherein the displacement map is generated based on the translated and sampled plurality of patch points.

13. The method of claim 10, wherein the digital 3D model is a digital 3D triangle mesh model and the method further comprises:

projecting the digital 3D triangle mesh model in a two-dimensional (2D) unit space to cause triangles in the digital 3D triangle mesh model to be mapped into congruent 2D triangles, and wherein the displacement map is generated based on the projected digital 3D triangle mesh model into the 2D unit space.

14. The method of claim 10, wherein the object comprises a fiber pulp-molding forming or transfer screen, and the plurality of features comprises a plurality of pores through which liquid of a fiber pulp slurry flows when molding a fiber pulp part using the object.

15. An apparatus comprising:

a processor; and a memory on which is stored instructions that when executed by the processor, cause the processor to:

identify, with respect to a digital three-dimensional (3D) model of an object, locations corresponding to positions at which a plurality of pores are to be added to the object;

for a location of the identified locations, compute a geodesic circle having a predefined dimension around the location, and sample a plurality of patch points inside of the computed geodesic circle on a surface of the digital 3D model;

generate a displacement map for the digital 3D model by respectively identifying displacements of the sampled plurality of patch points from the surface of the digital 3D model, as depths towards an opposite surface of the digital 3D model, the displacement map including identifications of the identified displacements; and provide the digital 3D model and the displacement map to a 3D fabrication system, such that the 3D fabrication system is to fabricate the object to include the plurality of pores based on the digital model and the displacement map, wherein as provided to the 3D fabrication system, the digital 3D model has not been modified based on the displacement map.

16. The apparatus of claim 15, wherein the instructions further cause the processor to:

translate the digital 3D model with the sampled plurality of patch points into a two-dimensional (2D) model, and wherein the displacement map is generated based on the 2D model.

17. The apparatus of claim 15, wherein the object comprises a fiber pulp-molding forming or transfer screen, such that liquid of a fiber pulp slurry flows through the plurality of pores of the object when molding a fiber pulp part using the object.

* * * * *